(12) United States Patent
Chandak et al.

(10) Patent No.: US 11,893,051 B2
(45) Date of Patent: Feb. 6, 2024

(54) STRUCTURE-BASED MULTI-INTENT EMAIL CLASSIFICATION

(71) Applicant: ACCENTURE GLOBAL SOLUTIONS LIMITED, Dublin (IE)

(72) Inventors: Anshuma Chandak, San Jose, CA (US); Abhishek Mukherji, Fremont, CA (US); Emmanuel Munguia Tapia, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 27 days.

(21) Appl. No.: 17/559,878

(22) Filed: Dec. 22, 2021

(65) Prior Publication Data

US 2023/0195772 A1 Jun. 22, 2023

(51) Int. Cl.
*G06F 16/00* (2019.01)
*G06F 16/35* (2019.01)
*G06N 20/00* (2019.01)

(52) U.S. Cl.
CPC ........... *G06F 16/353* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,102,192 | B2 * | 10/2018 | Upadhyay | H04L 51/046 |
| 10,785,185 | B2 * | 9/2020 | Vennam | G06F 40/279 |
| 11,048,880 | B2 * | 6/2021 | Ghatak | G06F 40/30 |
| 11,201,843 | B1 * | 12/2021 | Agarwal | H04L 51/42 |

OTHER PUBLICATIONS

Andrew Lampert et al., "Segmenting Email Message Text into Zones", CSIRO ICT Centre, Aug. 6-7, 2009, pp. 919-928, (10 pages).
Vitor R. Carvalho, "Learning to Extract Signature and Reply Lines from Email", Language Technologies Institute School of Computer Science, Carnegie Mellon University 2004, (8 pages).
Austin Walters, "Sentence Classifications with Neural Networks", https://github.com/lettergram/sentence-classification, Apr. 22, 2021 (8 pages).

* cited by examiner

*Primary Examiner* — Debbie M Le
(74) *Attorney, Agent, or Firm* — Mannava & Kang, P.C.

(57) ABSTRACT

In some examples, structure-based multi-intent email classification may include receiving an email thread that includes a plurality of emails including an email that is to be classified, and identifying, for the email thread, a process associated with the email thread, Based on the process associated with the email thread and for each sentence of the email that includes a plurality of sentences, a corresponding classifier may be determined from a plurality of classifiers, and applied to each sentence of the email to generate classified sentences. At least one entity may be extracted from each of the classified sentences of the email. Based on the at least one extracted entity, the email may be classified.

17 Claims, 18 Drawing Sheets

700 →

| | Classification | | Information Extraction | |
|---|---|---|---|---|
| Question | Command | statement | Question | Command | statement |
| 50 | 23 | 3 | 2 | 15 | 40 |

| | Classification | | |
|---|---|---|---|
| | Question | Command | statement |
| Account mastering Update | 0.13 | 0.20 | 0.67 |
| Invoice Copy | 0.80 | 0.18 | 0.02 |

| | Information Extraction | | |
|---|---|---|---|
| | Question | Command | statement |
| Invoice Number | 0.70 | 0.25 | 0.05 |
| Customer SAP ID | 0.05 | 0.90 | .05 |

RECEIVE AN EMAIL THREAD THAT INCLUDES A PLURALITY OF EMAILS INCLUDING AN EMAIL THAT IS TO BE CLASSIFIED
1602

↓

DETERMINE, FOR EACH SENTENCE OF THE EMAIL THAT INCLUDES A PLURALITY OF SENTENCES, A CORRESPONDING CLASSIFIER FROM A PLURALITY OF CLASSIFIERS
1604

↓

APPLY, TO EACH SENTENCE OF THE EMAIL, THE CORRESPONDING CLASSIFIER TO CLASSIFY EACH SENTENCE OF THE EMAIL TO GENERATE CLASSIFIED SENTENCES
1606

↓

EXTRACT, FROM EACH OF THE CLASSIFIED SENTENCES OF THE EMAIL, AT LEAST ENTITY
1608

↓

CLASSIFY, BASED ON THE AT LEAST ONE EXTRACTED ENTITY, THE EMAIL
1610

*FIG. 16*

STRUCTURE-BASED MULTI-INTENT EMAIL CLASSIFICATION

BACKGROUND

Emails may be grouped in the form of email threads that include a plurality of emails. Such emails may include prior conversations, and intents may span over multiple emails in the email threads. Additionally, emails may be relatively long and may often pertain to multiple topics, One or more of the emails in the email threads may need to be classified, for example, for further analysis or other purposes.

BRIEF DESCRIPTION OF DRAWINGS

Features of the present disclosure are illustrated by way of example and not limited in the following figure(s), in which like numerals indicate like elements, in which:

FIGS. 7A-7C illustrate learning sentence type weights for classification and information extraction to illustrate operation of the structure-based multi-intent email classification apparatus of FIG. 1, in accordance with an example of the present disclosure;

FIG. 16 illustrates a flowchart of an example method for structure-based multi-intent email classification in accordance with an example of the present disclosure.

DETAILED DESCRIPTION

Figure 1:
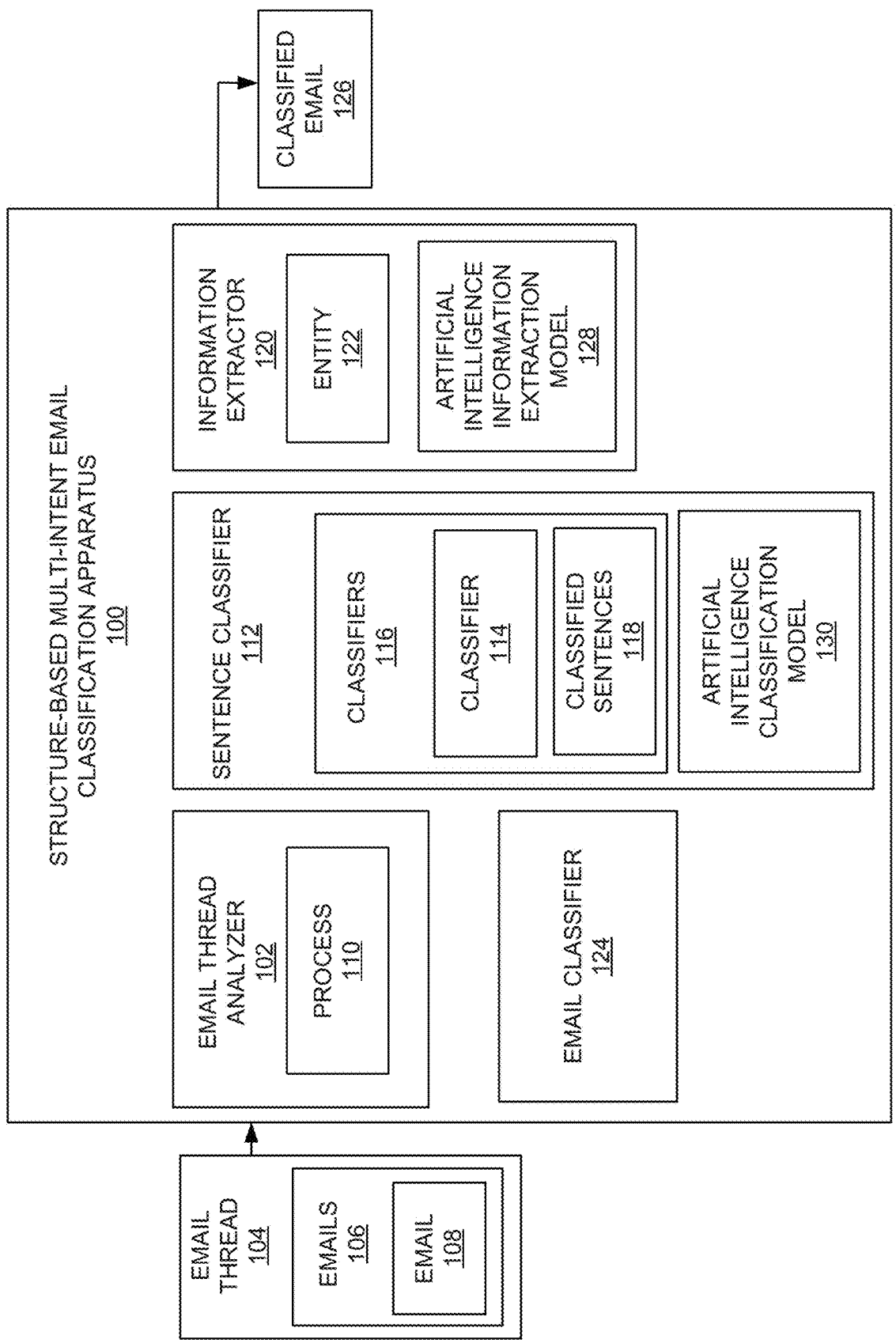
FIG. 1 illustrates a layout of a structure-based multi-intent email classification apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Structure-based multi-intent email classification apparatuses, methods for structure-based multi-intent email classification, and non-transitory computer readable media having stored thereon machine readable instructions to provide structure-based multi-intent email classification are disclosed herein. The apparatuses, methods, and non-transitory computer readable media disclosed herein provide for machine learning (ML) based case resolution that relies on issue classification and information extraction. In this regard, intelligent and tailor-made preprocessing of data may ensure success of machine learning techniques. The apparatuses, methods, and non-transitory computer readable media disclosed herein may be utilized with a variety of types of unstructured data, which also ensures extensibility of the solution. The apparatuses, methods, and non-transitory computer readable media disclosed herein may utilize structural analysis of emails to increase the overall machine learning model performance. Yet more, the apparatuses, methods, and non-transitory computer readable media disclosed herein may accurately classify text data, and particularly emails.

With respect to emails generally, emails may include prior conversations, and intents may span over multiple emails in the threads to add ambiguity. Leveraging temporal information may help model accuracy. Additionally, emails may be relatively long and may often pertain to multiple topics. In this regard, it is technically challenging to classify and extract information from emails. Yet further, it is technically challenging to eliminate irrelevant information during training of a machine learning model, which may lead to reduced model performance and misclassification.

In order to address at least the aforementioned technical challenges, the apparatuses, methods, and non-transitory computer readable media disclosed herein may include analysis of an email structure, and email communication to identify the most important information in an email and analyze it through a machine learning pipeline.

According the examples disclosed herein, the apparatuses, methods, and non-transitory computer readable media disclosed herein may derive a process from an email thread, and filter which classifier to utilize. In this regard, the apparatuses, methods, and non-transitory computer readable media disclosed herein may provide an understanding of an operations process from emails threads.

According the examples disclosed herein, the apparatuses, methods, and non-transitory computer readable media disclosed herein may provide content relevance determination from sentence type classification. In this regard, examples of sentence type classifiers may include statement, question, request, and command. The apparatuses, methods, and non-transitory computer readable media disclosed herein may provide for learning of relations to entities extracted and classified intents to reduce noisy content.

According the examples disclosed herein, the apparatuses, methods, and non-transitory computer readable media disclosed herein may provide for augmentation of a classification decision with information extraction. In this regard, the apparatuses, methods, and non-transitory computer readable media disclosed herein may provide for utilization of sentence type classification and entities extracted to boost classification accuracy.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example structure-based multi-intent email classification apparatus (hereinafter also referred to as "apparatus 100").

Referring to FIG. 1, the apparatus 100 may include an email thread analyzer 102 that is executed by at least one hardware processor (e.g., the hardware processor 1502 of FIG. 15, and/or the hardware processor 1704 of FIG. 17) to receive an email thread 104 that includes a plurality of emails 106 including an email 108 that is to be classified. The email thread analyzer 102 may identify, for the email thread 104, a process 110 associated with the email thread 104.

A sentence classifier 112 that is executed by at least one hardware processor (e.g., the hardware processor 1502 of FIG. 15, and/or the hardware processor 1704 of FIG. 17) may determine, based on the process 110 associated with the email thread 104 and for each sentence of the email 108 that includes a plurality of sentences, a corresponding classifier 114 from a plurality of classifiers 116. The sentence classifier 112 may apply, to each sentence of the email 108, the corresponding classifier 114 to classify each sentence of the email 108 to generate classified sentences 118.

An information extractor 120 that is executed by at least one hardware processor (e.g., the hardware processor 1502 of FIG. 15, and/or the hardware processor 1704 of FIG. 17) may extract, from each of the classified sentences of the email 108, at least one entity 122.

An email classifier 124 that is executed by at least one hardware processor (e.g., the hardware processor 1502 of FIG. 15, and/or the hardware processor 1704 of FIG. 17) may classify, based on the at least one extracted entity 122, the email 108 to generate a classified email 126. In this regard, the classification and/or extracted information may be used to control and/or drive a further process. For example, as disclosed herein with respect to FIG. 12, the classification and/or extracted information may be automatically (e.g., without human intervention) input to a third party tool such as SAP at 1206, and further utilized by an email generator (not shown) that is executed by at least one hardware processor (e.g., the hardware processor 1502 of FIG. 15, and/or the hardware processor 1704 of FIG. 17) to automatically generate a further email (or chat) that includes the extracted information as shown at 1208. Alternatively or additionally, the classification and/or extracted information may be automatically used by a purchase controller (not shown) that is executed by at least one hardware processor (e.g., the hardware processor 1502 of FIG. 15, and/or the hardware processor 1704 of FIG. 17) to purchase a product or service specified by the extracted information.

According to examples disclosed herein, the corresponding classifier 114 may be determined from a plurality of classifiers 116 that include at least two of a question, a statement, a command, or a request.

According to examples disclosed herein, the sentence classifier 112 may utilize an artificial intelligence classification model 130 to determine, based on the process associated with the email thread and for each sentence of the email that includes the plurality of sentences, the corresponding classifier from the plurality of classifiers.

According to examples disclosed herein, the information extractor 120 may utilize an artificial intelligence information extraction model 128 to extract, from each of the classified sentences of the email, at least one entity.

According to examples disclosed herein, the email classifier 124 may classify, based on the at least one extracted entity 122, the email 108 by determining, for a plurality of extracted entities including the at least one extracted entity, a confidence associated with each entity of the plurality of extracted entities. Further, the email classifier 124 classify, based on the confidence associated with each entity of the plurality of extracted entities, the email 108.

According to examples disclosed herein, the email classifier 124 may aggregate the confidence associated with each entity of the plurality of extracted entities.

Figure 2:
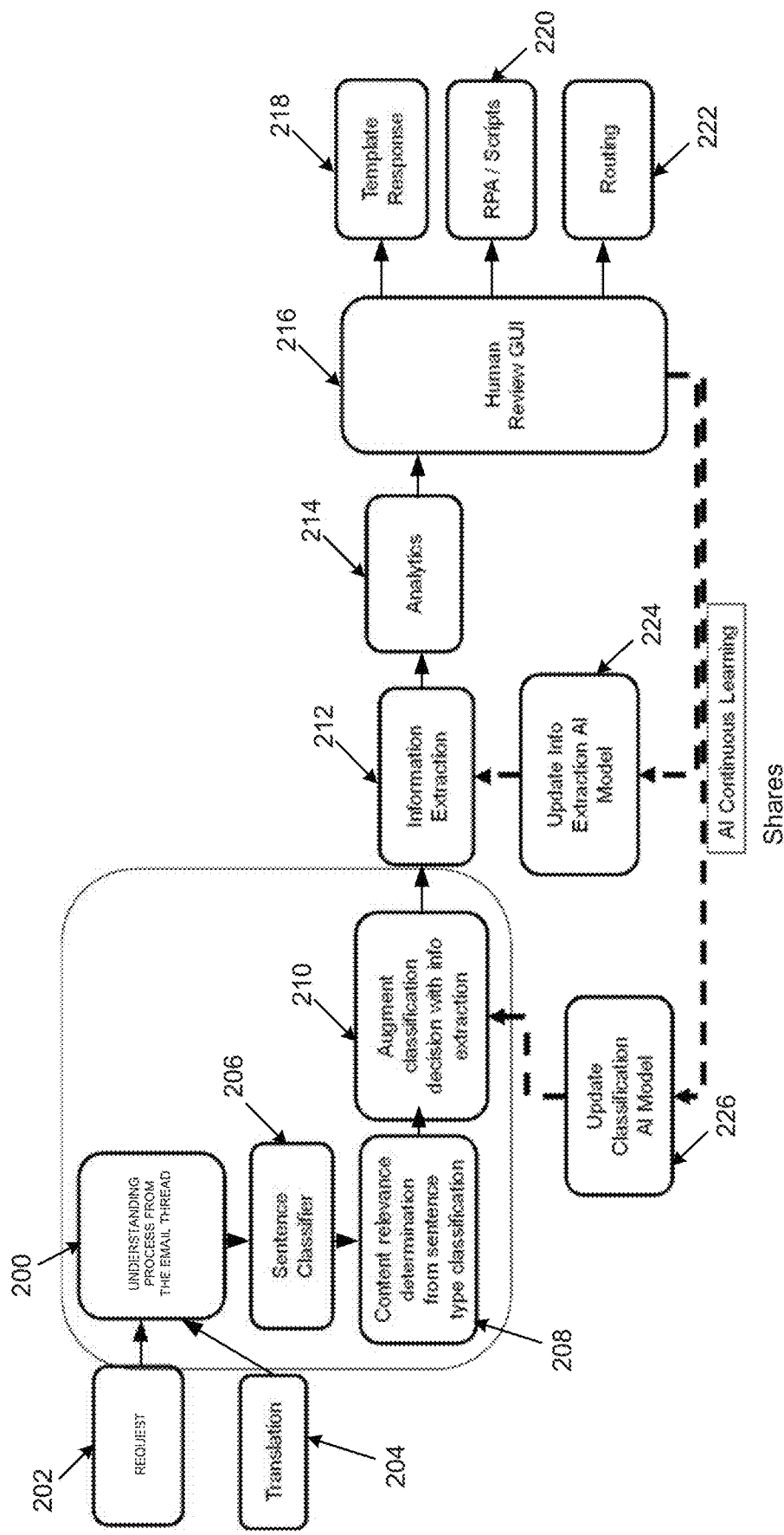
FIG. 2 illustrates a logical flow to illustrate operation of the structure-based multi-intent email classification apparatus of FIG. 1, in accordance with an example of the present disclosure.

FIG. 2 illustrates a logical flow to illustrate operation of the apparatus 100, in accordance with an example of the present disclosure.

Referring to FIG. 2, at 200 the email thread analyzer 102 may receive a request 202 classify an email 108 or a plurality of emails for an email thread 104. In this regard, a translation 204 of the email 108 may be received if the email is in a language other than a specified language such as English.

The email thread analyzer 102 may determine a process 110 from the email thread 104, and forward the identified process 110 the sentence classifier 112 at 206. The process 110 may be utilized by the sentence classifier 112 to classify each sentence of the email 108. For example, the process 110 may be utilized by the sentence classifier 112 to narrow possible classes for each sentence of the email 108. In one example, the process 110 may describe a logical path taken by content of the email (e.g., from dispute to past due to remittance advice, etc., as disclosed herein with respect to FIG. 6).

The sentence classifier 112 may determine content relevance from sentence type classification at 208. The sentence classifier 112 may classify each sentence of the email 108, for example, as a statement, a question, a request, or a command. The classified sentences 118 may then be used to extract entities as disclosed herein. The classes of statement, question, request, and command may be considered mutually exclusive.

The content relevance may be utilized to augment classification decision with information extraction at 210.

At 212, the information extractor 120 may extract, from each of the classified sentences of the email 108, at least one entity 122. The extracted information at 212 may be analyzed by the email classifier 124 at 214.

The analysis results from 214 may be displayed for review at 216 on a graphical user interface, and may be further utilized for template response at 218, scripts at 220, and routing at 222. The template response at 218 may include utilization of the extracted information from 212 to automatically generate an email that includes the extracted information. The scripts at 220 may be utilized to connect to a third party tool, and routing at 222 may be utilized to route emails automatically. For example, based on an incoming email, the scripts at 220 may be used to place an order automatically, or apply a discount to an order and generate an email with an invoice attached.

At 224, an artificial intelligence information extraction model 128 may be updated based on the review at 216, and the extracted information at 212 may receive updated information extraction from the artificial intelligence information extraction model 128. Similarly, at 226, an artificial intelligence classification model 130 may be updated based on the review at 216, and the classification decision with information extraction at 210 may receive updated classification information from the artificial intelligence classification model 130.

Figure 3:
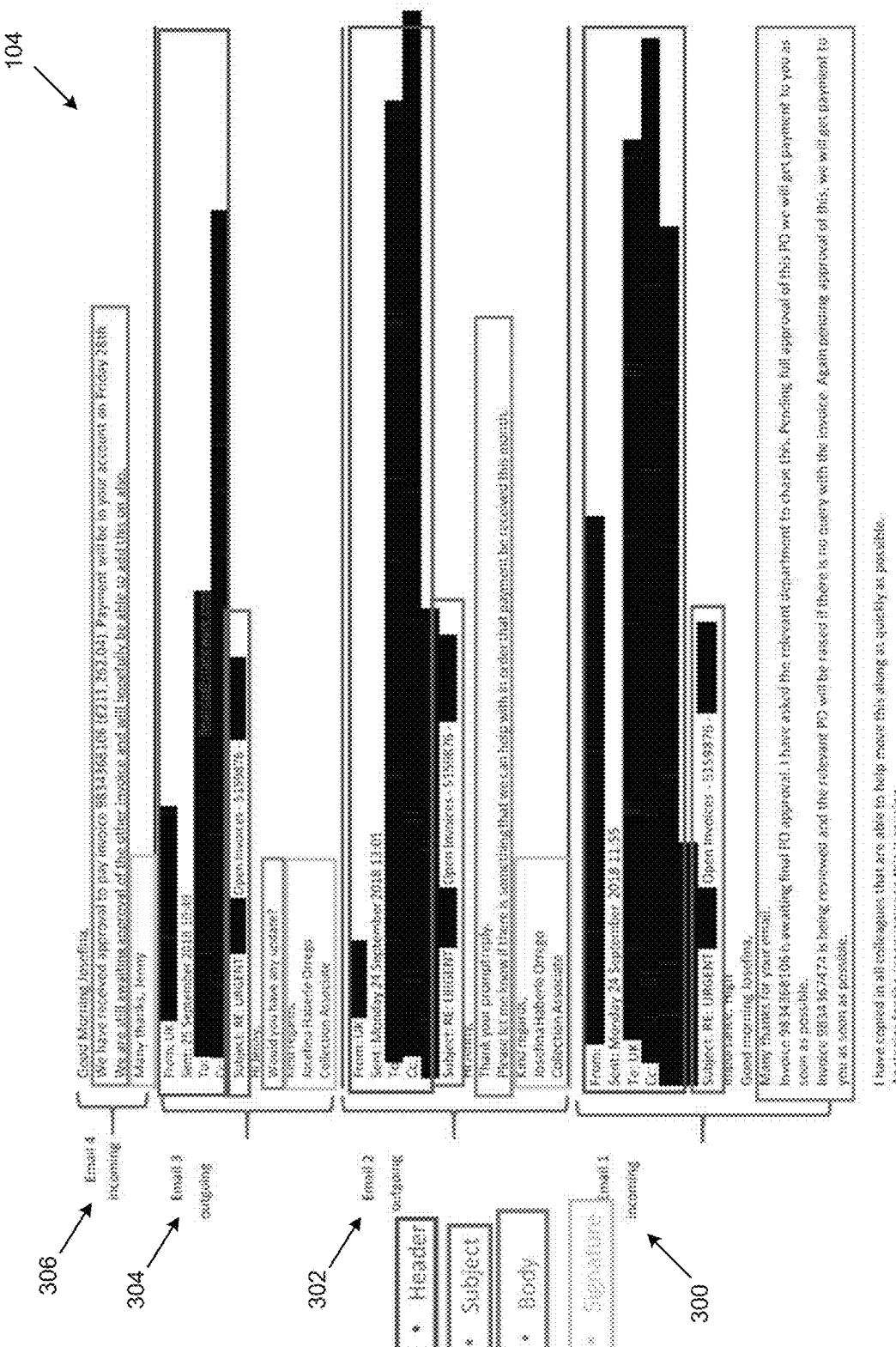
FIG. 3 illustrates a process sequence to illustrate operation of the structure-based multi-intent email classification apparatus of FIG. 1, in accordance with an example of the present disclosure.

FIG. 3 illustrates a process sequence to illustrate operation of the apparatus 100, in accordance with an example of the present disclosure.

Referring to FIG. 3, the process sequence may include emails 1-4 as shown at 300-306. For emails 1-4, features such as the header, subject, body, and signature may be identified as shown. In the email thread 104 shown, emails 1 and 4 may be incoming emails, and emails 2 and 3 may be outgoing emails.

Figure 4:
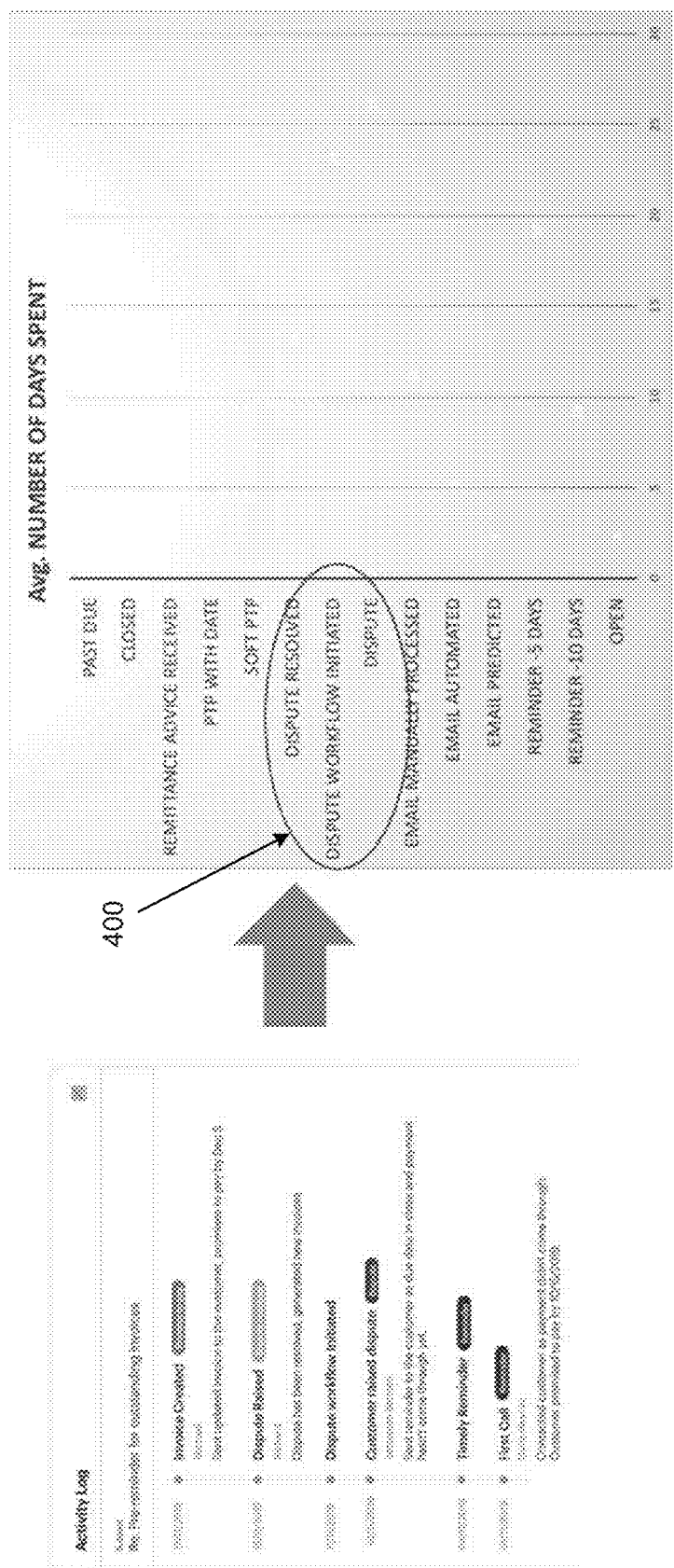
FIG. 4 illustrates a process understanding from email threads to illustrate operation of the structure-based multi-intent email classification apparatus of FIG. 1, in accordance with an example of the present disclosure.

FIG. 4 illustrates a process understanding from email threads to illustrate operation of the apparatus 100, in accordance with an example of the present disclosure.

Referring to FIG. 4, the process understanding from emails threads may be used to determine the disputes, as shown at 400, are the topmost reasons for payment delays. In this regard, as disclosed herein, the email thread analyzer 102 may identify, for the email thread 104, the process 110 associated with the email thread 104. For the example of FIG. 4, the process 110 may pertain to dispute resolution, dispute workflow initiation, or disputes generally, FIG. 5 illustrates multiple binary classifiers to run for each email to illustrate operation of the apparatus 100, in accordance with an example of the present disclosure.

Figure 5:
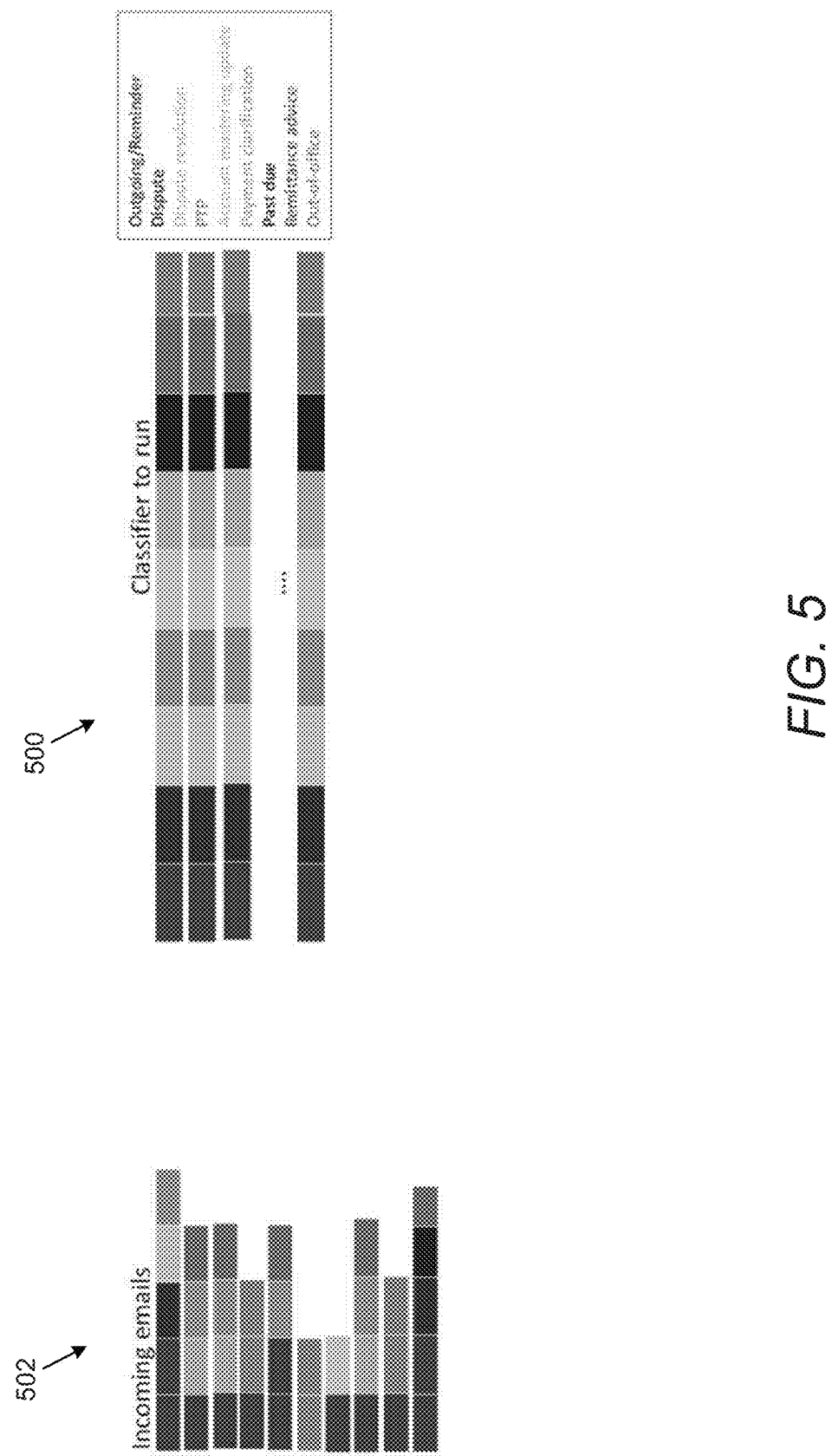
FIG. 5 illustrates multiple binary classifiers to run for each email to illustrate operation of the structure-based multi-intent email classification apparatus of FIG. 1, in accordance with an example of the present disclosure.

Referring to FIG. 5, as disclosed herein, the sentence classifier 112 may determine, based on the process 110 associated with the email thread 104 and for each sentence of the email 108 that includes a plurality of sentences, the corresponding classifier 114 from the plurality of classifiers 116, Each binary classifier may be executed for each incoming email. For example, as shown at 500, the binary classifiers as shown may be executed for incoming emails 502.

Figure 6:
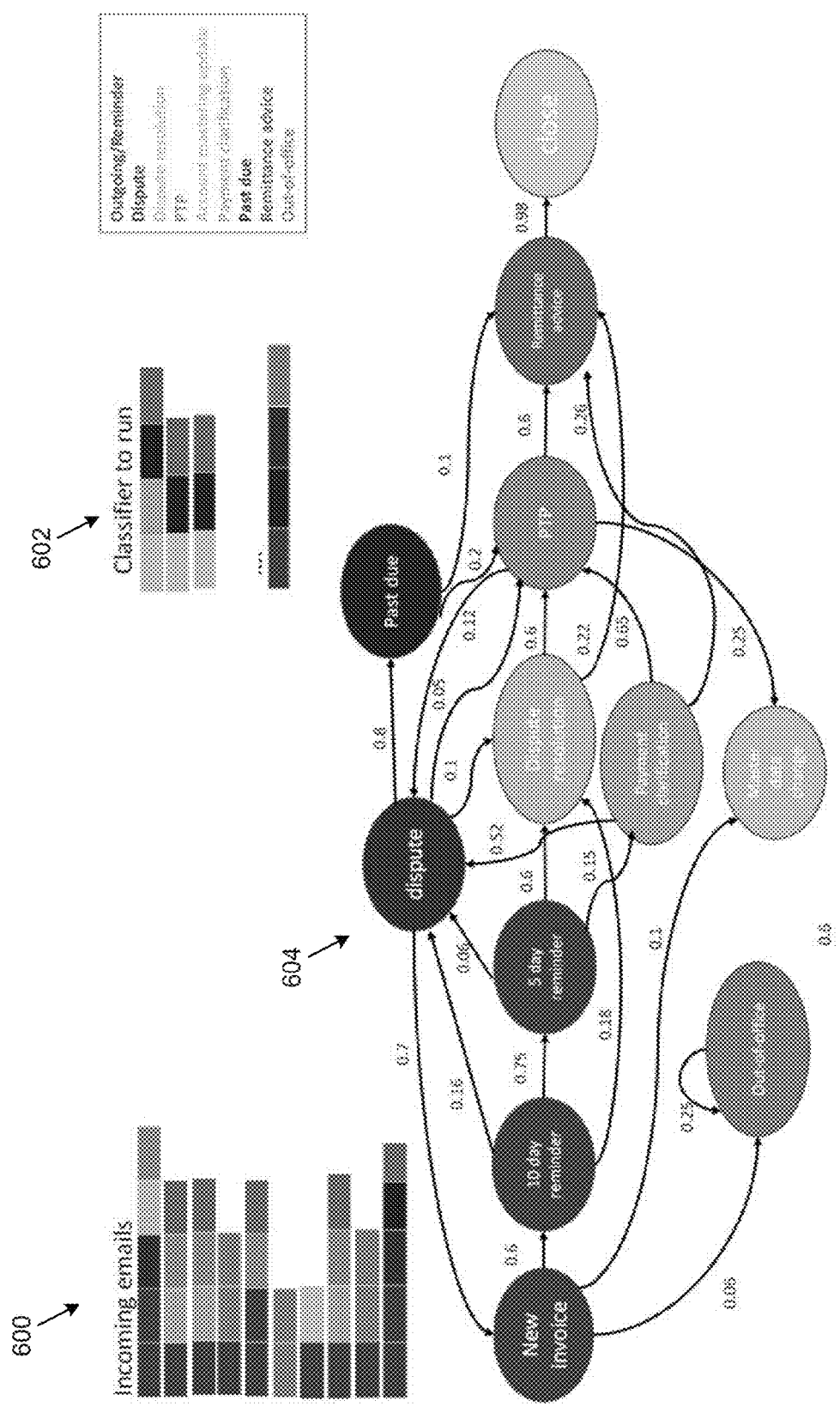
FIG. 6 illustrates classifier selection based on process understanding from email threads to illustrate operation of the structure-based multi-intent email classification apparatus of FIG. 1, in accordance with an example of the present disclosure.

FIG. 6 illustrates classifier selection based on process understanding from email threads to illustrate operation of the apparatus 100, in accordance with an example of the present disclosure.

Referring to FIG. 6, as disclosed herein, the sentence classifier 112 may determine, based on the process 110 associated with the email thread 104 and for each sentence of the email 108 that includes a plurality of sentences, the corresponding classifier 114 from the plurality of classifiers 116, For example, with respect to incoming emails 600, classifiers to be executed are shown at 602. In this regard, as shown at 604, classifier selection may be performed based on process understanding from email threads. In this regard, when a new email related to invoicing (e.g., new invoice) is received, there is a 0.8 transition probability that the email will proceed from dispute to past due, etc. This knowledge of transition probabilities may be included in the artificial intelligence classification model 130, and may be utilized to select appropriate classifiers as disclosed herein. In this regard, the transition probability may be used to reduce classifiers, and select an appropriate classifier, for example, by specifying what may occur after a specific type of email (e.g., in FIG. 6, "past due" occurs after "dispute", as opposed to "remittance advice" which occurs after "dispute", but not directly after "past due"). For example, for a new e-mail pertaining to "past due", the possibilities for that new e-mail may include "PTP" and "remittance advice". In this regard, the higher the probability, the higher the chance of the next occurrence (e.g., "PTP" that includes a probability of 0.2, versus "remittance advice" that includes a probability of 0.1). The transition probabilities may be determined based on analysis of historical email threads, such as the emails as shown at 600. Each row at 600 may represent an email thread.

FIGS. 7A-7O illustrate learning sentence type weights for classification and information extraction to illustrate operation of the apparatus 100, in accordance with an example of the present disclosure.

Referring to FIG. 7A, as shown at 700, every sentence may be labeled as a question, a request, a statement, or a command. An associated count may be analyzed to continuously learn which type of statement is used for which event. For example, at 700, 50 sentences were questions, 23 sentences were commands, etc., were used for classification, and subsequently for information extraction. In this regard, with respect to utilization of the counts for classification, for example, 50% of the time classification may be performed on questions, 23% of the time classification may be performed on commands, and 3% of the time classification may be performed on statements. Thus, statements may be effectively removed from classification. Similarly, with respect to utilization of the counts for information extraction, for example, 40% of the time information extraction may be performed on questions, 15% of the time information extraction may be performed on commands, etc.

Referring to FIG. 7B, as shown at 702, an event wise distribution availability is shown. In this regard, for a sentence classified as a statement (e.g., 0.67), such a sentence may represent an account mastering update. Further, for a sentence classified as a question (e.g., 0.8), such a sentence may represent an invoice copy. In this regard, with respect to classification, for "account mastering update", a statement will have account mastering update 67% of the time. Similarly, for "invoice copy", a question will have invoice copy 80% of the time, and a statement will have invoice copy 2% of the time. Thus, statements may be effectively removed from classification.

Referring to FIG. 7O, as shown at 704, entity wise distribution availability is shown. In this regard, for information extraction, due to the distribution per entity available, it is known as to which type of sentence is to be used for which entity. For intent classification, each intent may have a binary classifier that runs on one type of sentence. This is based on each intent's distribution. For example, a binary classifier may indicate invoice copy or not (will run on questions 0.8 learned probability), account mastering update (will run on statements 0.67 learnt probability), In this regard, with respect to information extraction, for "invoice number", a question will have invoice number 70% of the time. In this regard, if it is learnt from the collected data that specific information, such as invoice number, can be found 70% of the time in a question, and only 25% and 5% in a command and statement, respectively, then for any new incoming email, a first attempt will be made on question sentences to extract invoice numbers. Similarly, for "Customer SAP ID" looking at the command sentences would suffice 90% of the times. Thus, other sentences may be eliminated from the search. For example, for "customer SAP ID", a command will have customer SAP ID 90% of the time, and questions and statements will have customer SAP ID 5% of the time. Thus, questions and statements may be effectively removed from information extraction.

Figure 8:
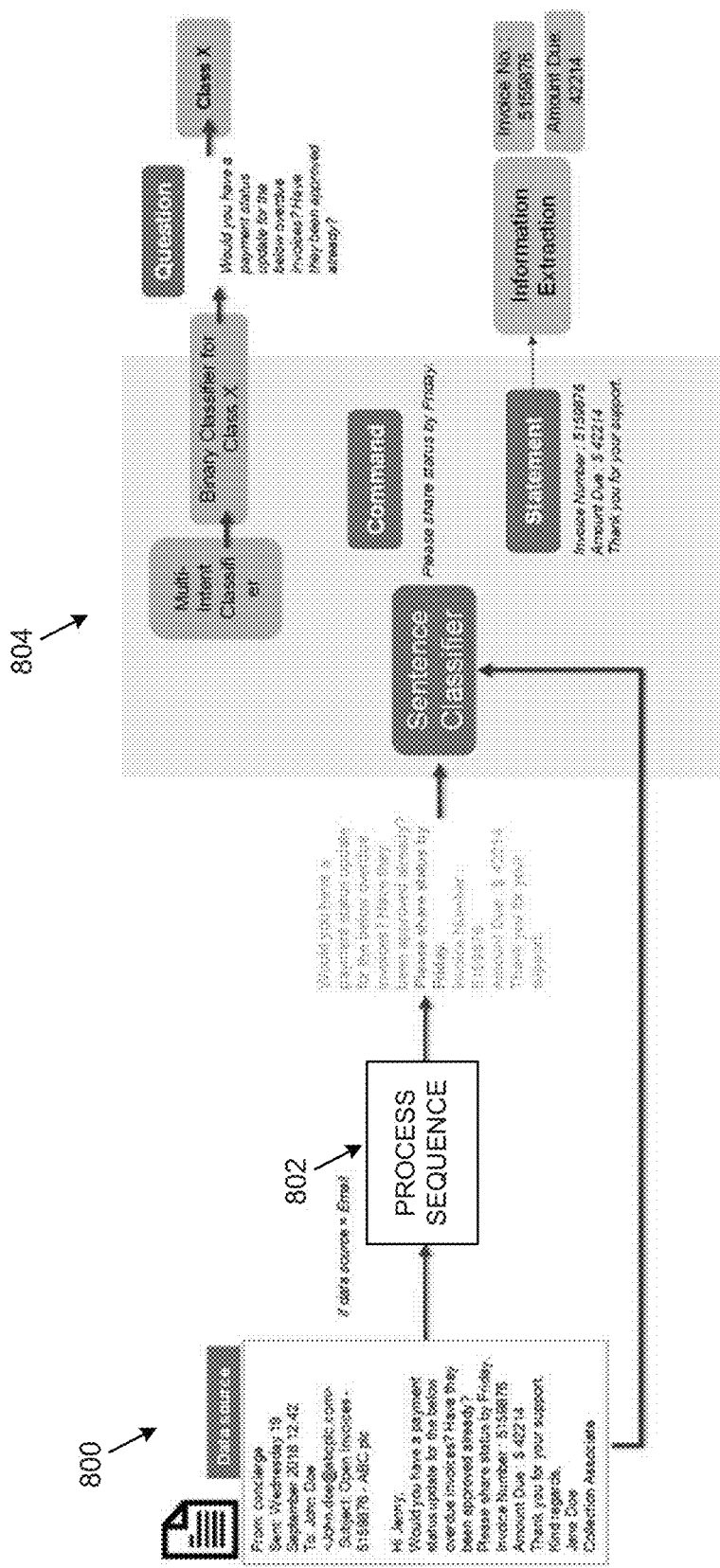
FIG. 8 illustrates content relevance based on sentence type classification to illustrate operation of the structure-based multi-intent email classification apparatus of FIG. 1, in accordance with an example of the present disclosure.

FIG. 8 illustrates content relevance based on sentence type classification to illustrate operation of the apparatus 100, in accordance with an example of the present disclosure.

Referring to FIG. 8, with respect to content relevance based on sentence type classification, for an email from a data source at 800, at 802, a process sequence may be determined with respect to the email. In this regard, the email thread analyzer 102 may identify, for the email thread 104, the process 110 associated with the email thread 104. At 804, the sentence classifier 112 may classify sentences as a question, a request, a statement, or a command.

Figure 9:
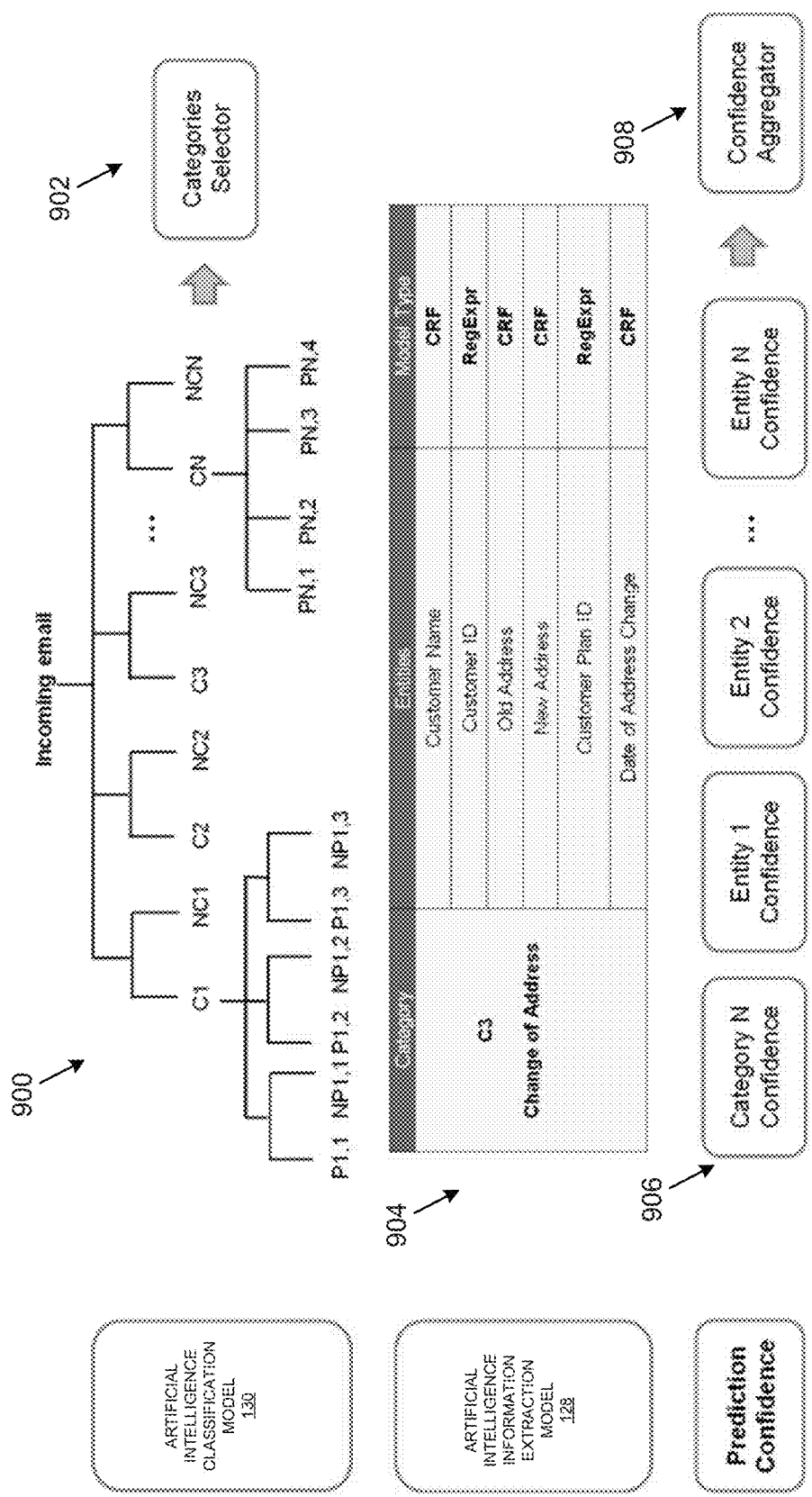
FIG. 9 illustrates augment classification decision with information extraction to illustrate operation of the structure-based multi-intent email classification apparatus of FIG. 1, in accordance with an example of the present disclosure.

FIG. 9 illustrates augment classification decision with information extraction to illustrate operation of the apparatus 100, hi accordance with an example of the present disclosure.

Referring to FIG. 9, classification and information extraction may be implemented with each other so that entities extracted may be fed into the artificial intelligence classification model 130 for classification. As shown in 900, the artificial intelligence classification model 130 may be utilized for category selection at 902 with respect to an incoming email. At 904, the artificial intelligence information extraction model 128 may be used on a category to extract at least one entity. At 906, a confidence may be determined for each entity associated with a category, and aggregated at 908.

Figure 10:
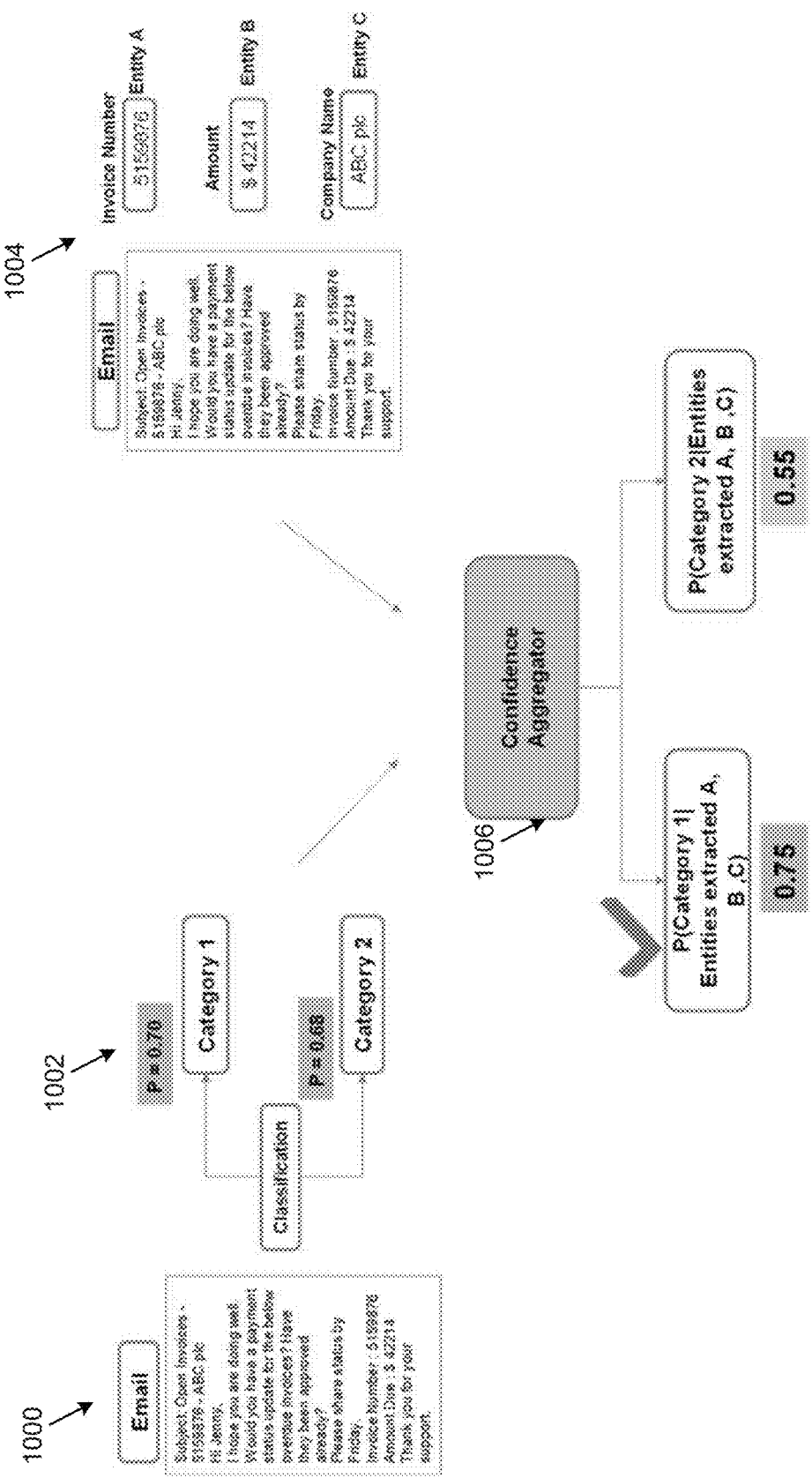
FIG. 10 illustrates an example of an augmenting classifier with information extraction to illustrate operation of the structure-based multi-intent email classification apparatus of FIG. 1, in accordance with an example of the present disclosure.

FIG. 10 illustrates an example of an augmenting classifier with information extraction to illustrate operation of the apparatus 100, in accordance with an example of the present disclosure.

Referring to FIG. 10, for the email at 1000, category classification may be performed at 1002, and further entities may be extracted at 1004. In this regard, confidence values associated with the category classification and the entity extraction may be aggregated at 1006. With respect to determination of aggregated confidence values, and utilization thereof for email classification, at 1002, the probability of an email as being associated with category 1 may be 0.70, and the probability of the email as being associated with category 2 may be 0.68. At 1004, entities A, B, and C may be extracted from the email. At 1006, the aggregated conditional probability that the email is associated with category 1 given entities A, B, and C may be specified at 0.75, and the aggregated conditional probability that the email is associated with category 2 given entities A, B, and C may be specified at 0.55. Thus, the email may be classified as category 1.

Figure 11:
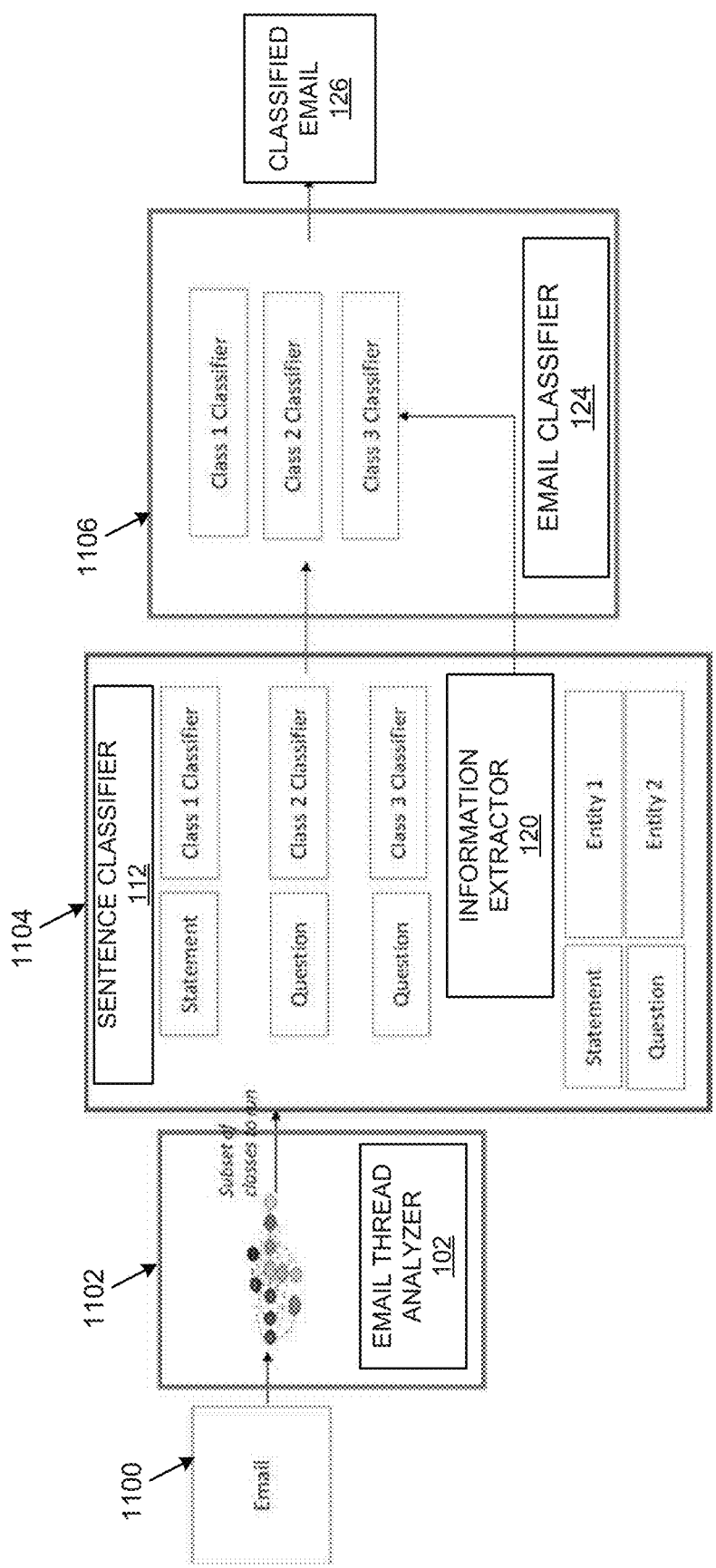
FIG. 11 illustrates an overall workflow to illustrate operation of the structure-based multi-intent email classification apparatus of FIG. 1, in accordance with an example of the present disclosure.

FIG. 11 illustrates an overall workflow to illustrate operation of the apparatus 100, in accordance with an example of the present disclosure.

Referring to FIG. 11, for an email received at 1100, at 1102, the email thread analyzer 102 may determine a classification based on a learnt process. In this regard, the email thread analyzer 102 may identify, for the email thread 104 the process 110 associated with the email thread 104.

At 1104, the sentence classifier 112 may determine, based on the process 110 associated with the email thread 104 and for each sentence of the email 108 that includes a plurality of sentences, a corresponding classifier 114 from a plurality of classifiers 116. The sentence classifier 112 may apply, to each sentence of the email 108, the corresponding classifier 114 to classify each sentence of the email 108 to generate classified sentences 118. For example, a sentence type may be determined, and content relevance may be determined with respect to the sentence type. For example, the sentence classifier 112 may determine a sentence type such as, for example, a statement, a question, a command, or another type of sentence type. Further, at 1104, the information extractor 120 may extract entities from the sentences. For example, the information extractor 120 may extract entities 1 and 2 from the sentences that are classified as statement and question.

At 1106, the email classifier 124 may augment classification with the extracted information to generate the classified email 126 (e.g., class 3 for the example of FIG. 11).

Figure 12:
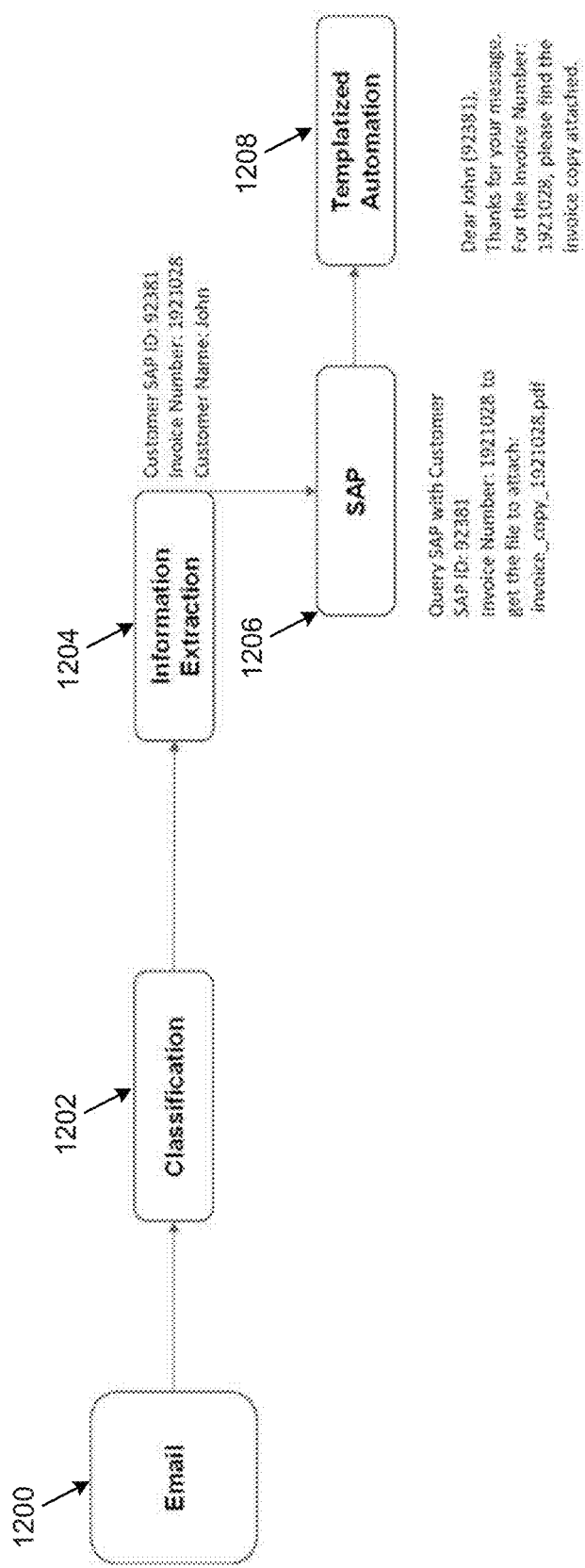
FIG. 12 illustrates an application use case for email classification to illustrate operation of the structure-based multi-intent email classification apparatus of FIG. 1, in accordance with an example of the present disclosure.

FIG. 12 illustrates an application use case for email classification to illustrate operation of the apparatus 100, in accordance with an example of the present disclosure.

Referring to FIG. 12, Referring to FIG. 12, for an email received at 1200, at 1202, the sentence classifier 112 may determine a classification based on learnt process. In this regard, a sentence type may be determined, and content relevance may be determined with respect to the sentence type. For example, the sentence classifier 112 may determine a sentence type such as, for example, a statement, a question, a command, or another type of sentence type. Further, at 1204, the information extractor 120 may extract entities from the sentences. Further, the email classifier 124 may augment classification with the extracted information to generate a classification prediction to classify the email to a specified class. At 206, a SAP may be queried with customer information, and at 1208, template automation may be performed.

Figure 13:
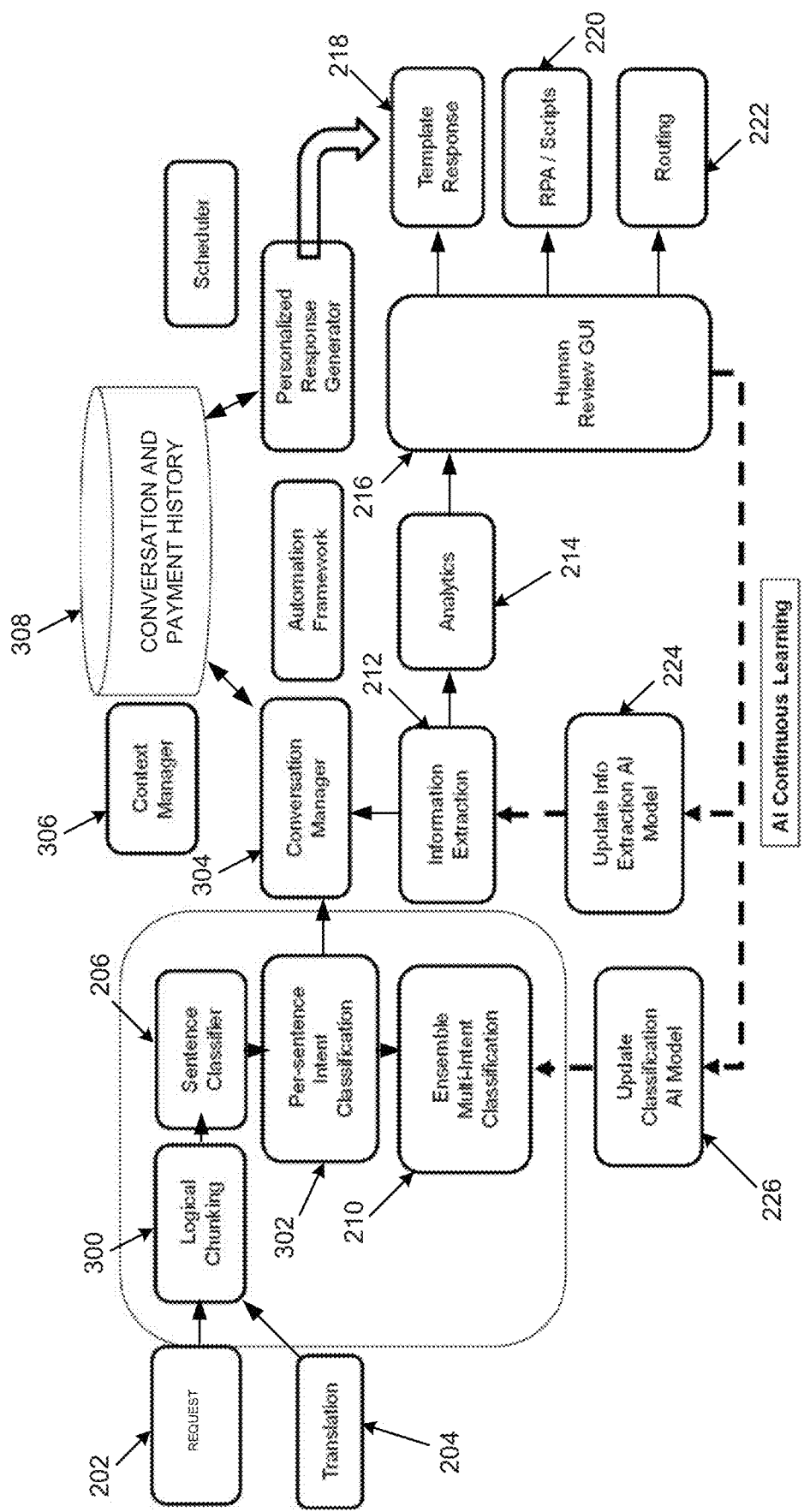
FIG. 13 illustrates leveraging of email structure for multi-intent email classification to illustrate operation of the structure-based multi-intent email classification apparatus of FIG. 1, in accordance with an example of the present disclosure.

FIG. 13 illustrates leveraging of email structure for multi-intent email classification to illustrate operation of the apparatus 100, in accordance with an example of the present disclosure.

Referring to FIGS. 2 and 13, various functionality associated with reference to FIG. 2 is similarly performed as shown in FIG. 13. Additionally, with respect to the request at block 202, logical chunking may be performed at block 300 to disregard irrelevant aspects of an email (e.g., disclaimers, signatures, etc.). Further, at block 302, intent classification may be performed. Output of the pre-sentence intent classification at block 302 and the information extraction at block 212 may be sent to a conversation manager at block 304. A content manager at block 306 may manage user conversation and payment history at 308.

Figure 14:
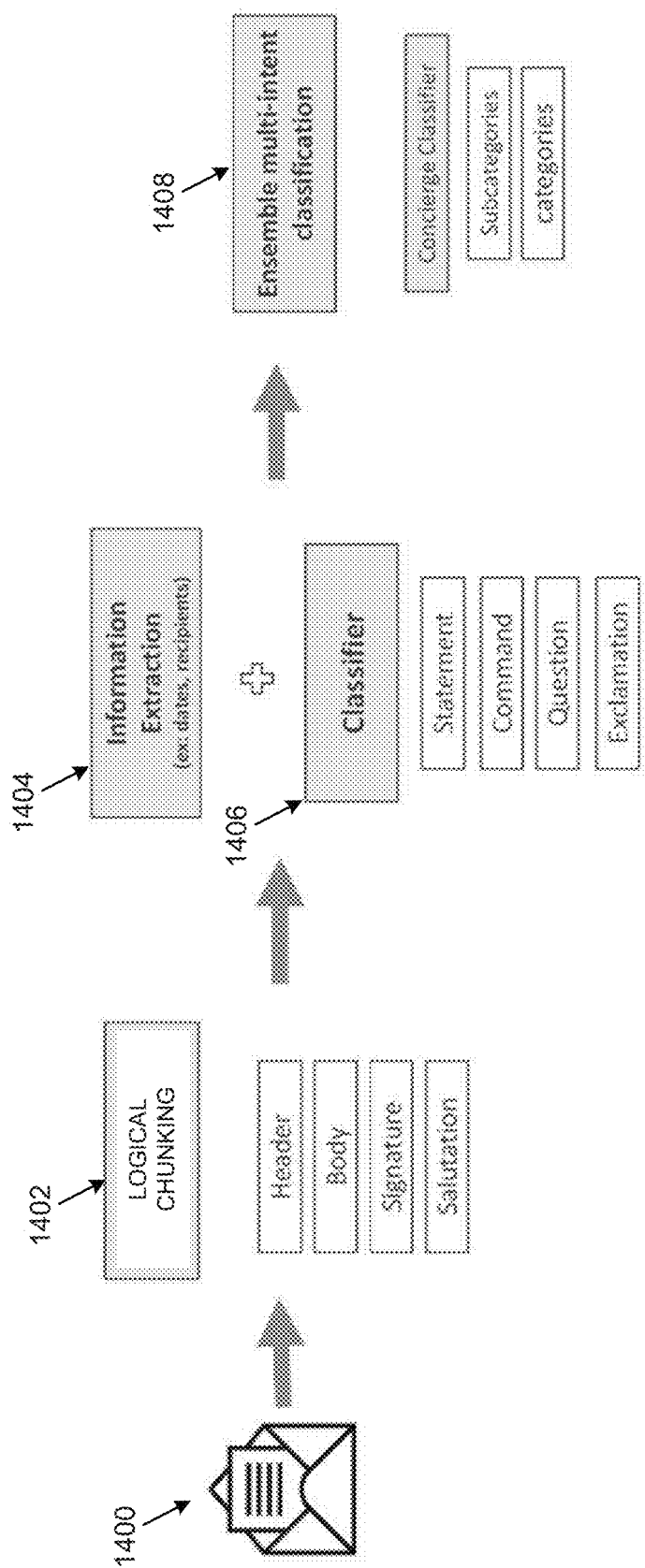
FIG. 14 illustrates multi-intent classification to illustrate operation of the structure-based multi-intent email classification apparatus of FIG. 1, in accordance with an example of the present disclosure.

FIG. 14 illustrates multi-intent classification to illustrate operation of the apparatus 100, in accordance with an example of the present disclosure.

Referring to FIG. 14, for an email at 1400, logical chunking may be performed at block 1402 to determine details such as header, body, signature, and salutation. At 1404, the information extractor 120 may extract information such as dates, recipients, etc. At 1406, the sentence classifier 112 may classify the email sentences into statement, command, question, exclamation, etc. At 1408, with respect to multi-intent classification, the email classifier 124 may perform classification with respect to categories and subcategories.

Figure 15:
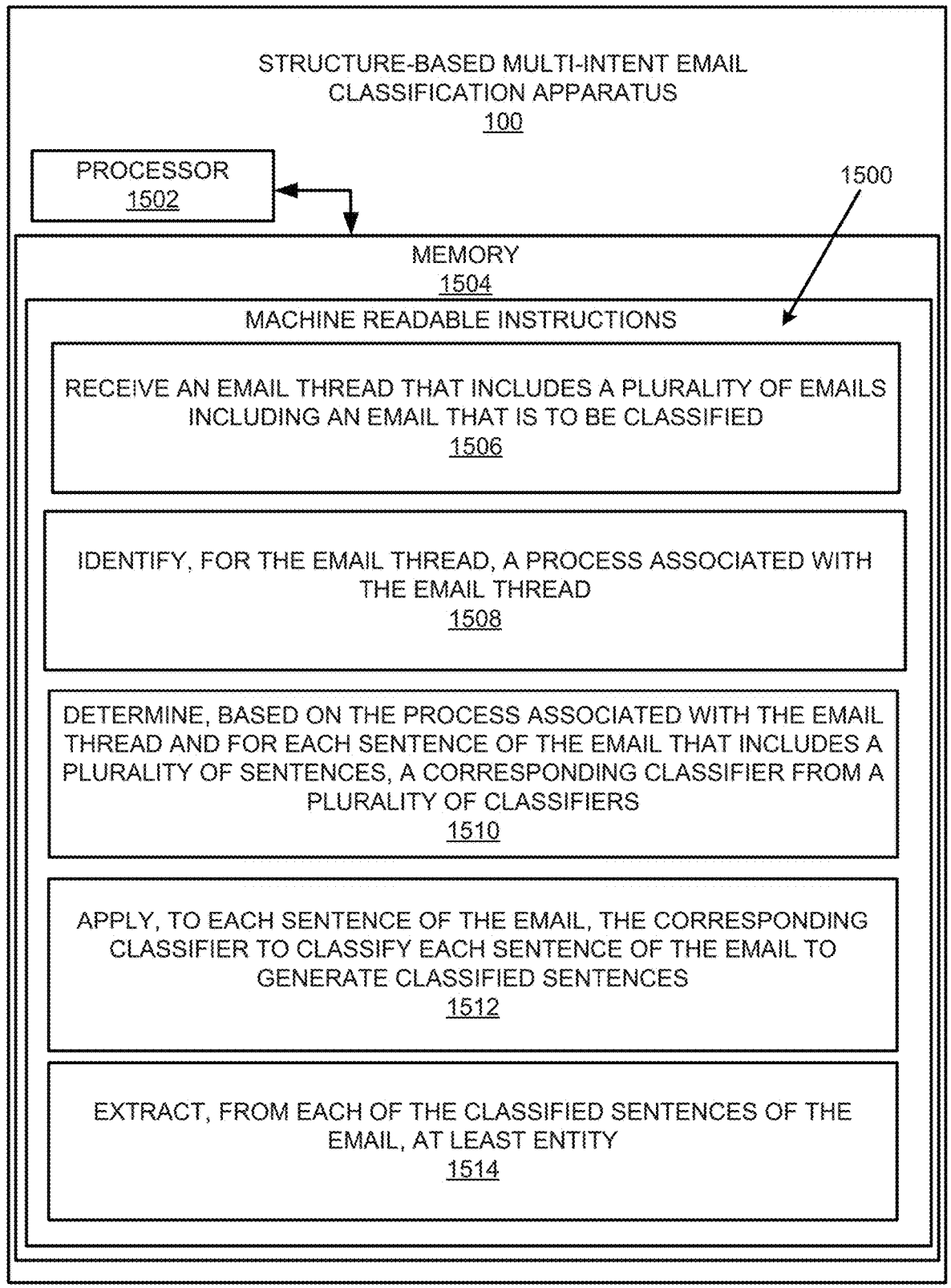
FIG. 15 illustrates an example block diagram for structure-based multi-intent email classification in accordance with an example of the present disclosure.
Figure 15:
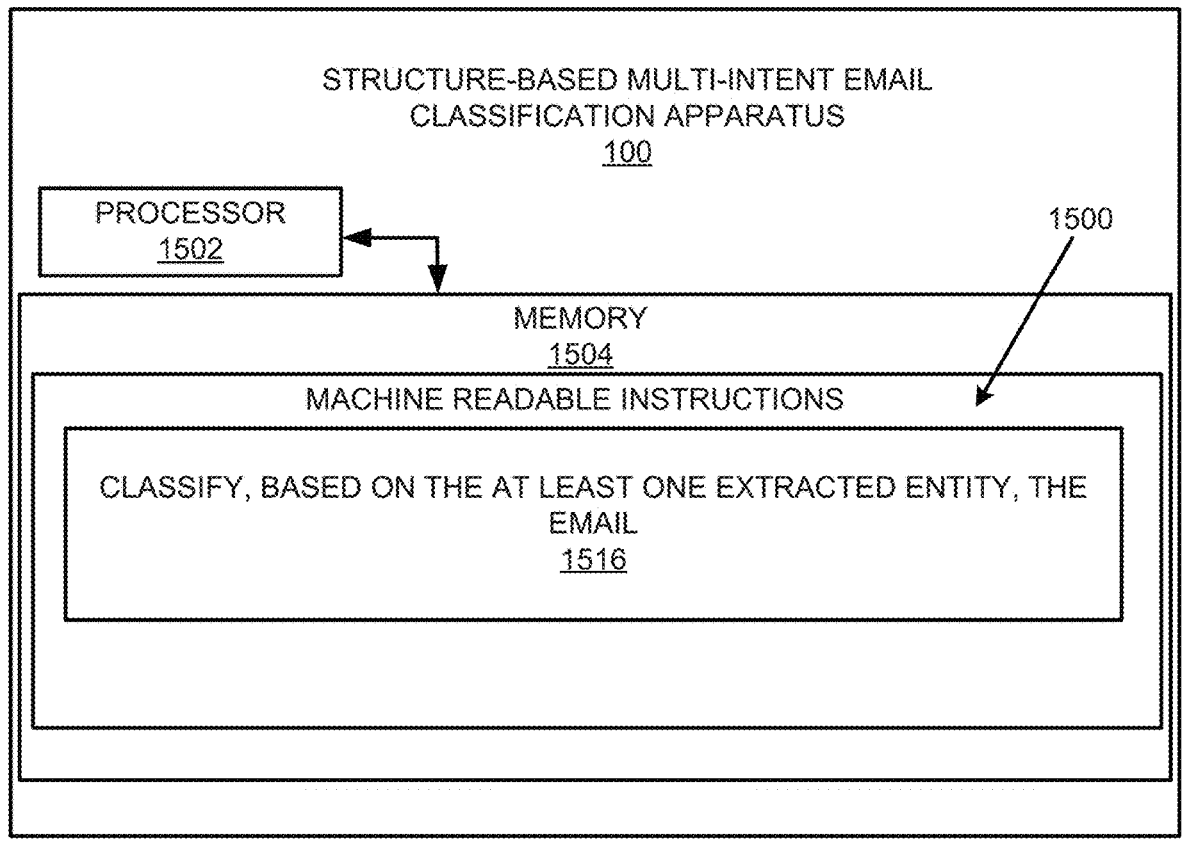
Figure 17:
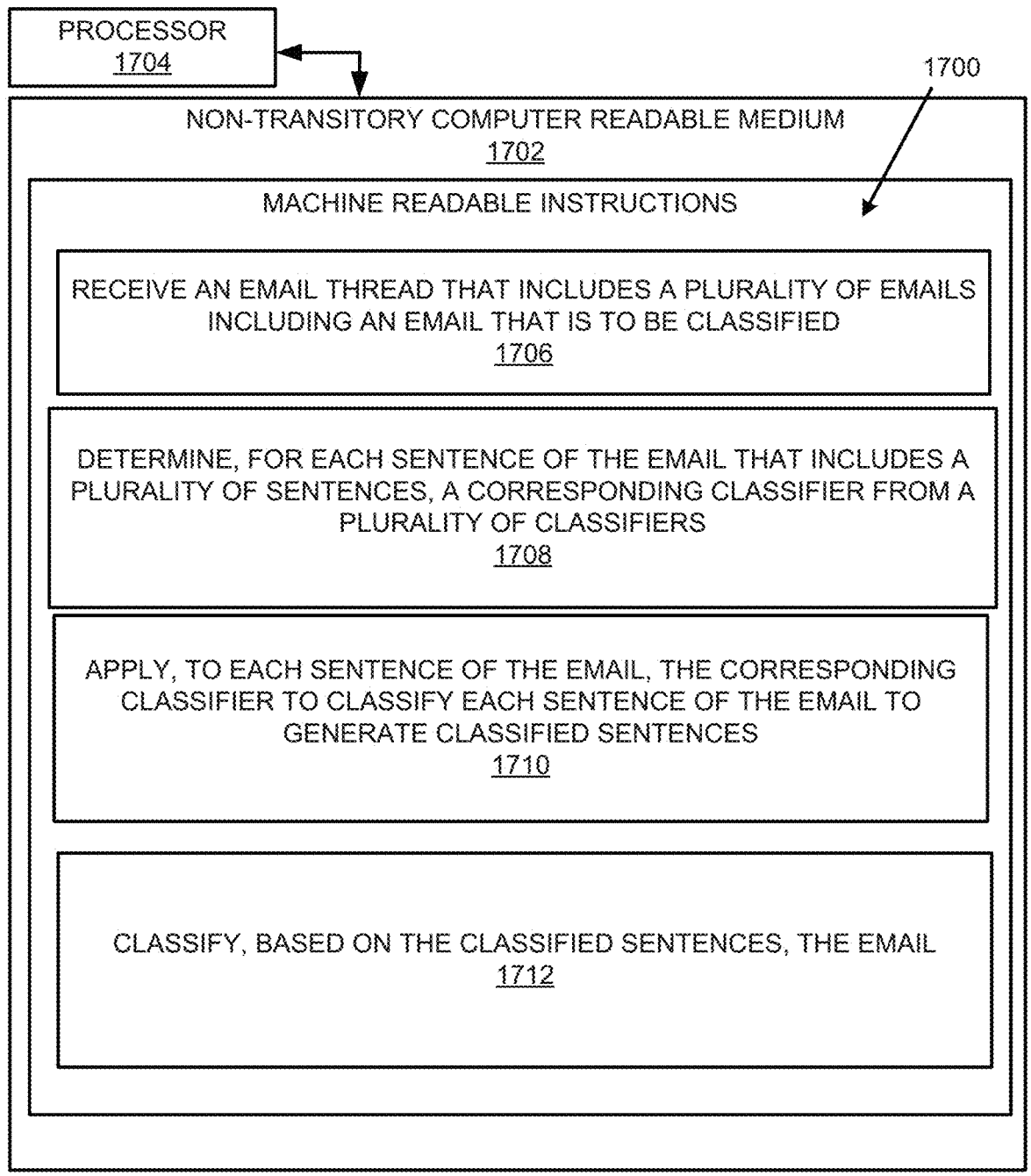
FIG. 17 illustrates a further example block diagram for structure-based multi-intent email classification in accordance with another example of the present disclosure.

FIGS. 15-17 respectively illustrate an example block diagram 1500, a flowchart of an example method 1600, and a further example block diagram 1700 for structure-based multi-intent email classification, according to examples. The block diagram 1500, the method 1600, and the block diagram 1700 may be implemented on the apparatus 100 described above with reference to FIG. 1 by way of example and not of limitation. The block diagram 1500, the method 1600, and the block diagram 1700 may be practiced in other apparatus. In addition to showing the block diagram 1500, FIG. 15 shows hardware of the apparatus 100 that may execute the instructions of the block diagram 1500. The hardware may include a processor 1502, and a memory 1504 storing machine readable instructions that when executed by the processor cause the processor to perform the instructions of the block diagram 1500. The memory 1504 may represent a non-transitory computer readable medium. FIG. 16 may represent an example method for structure-based multi-intent email classification, and the steps of the method. FIG. 17 may represent a non-transitory computer readable medium 1702 having stored thereon machine readable instructions to provide structure-based multi-intent email classification according to an example. The machine readable instructions, when executed, cause a processor 1704 to perform the instructions of the block diagram 1700 also shown in FIG. 17.

The processor 1502 of FIG. 15 and/or the processor 1704 of FIG. 17 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1702 of FIG. 17), such as hardware storage devices (e.g., RAM (random access memory), ROM (read only memory), EPROM (erasable, programmable ROM), EEPROM (electrically erasable, programmable ROM), hard drives, and flash memory). The memory 1504 may include a RAM, where the machine readable instructions and data for a processor may reside during runtime.

Referring to FIGS. 1-15, and particularly to the block diagram 1500 shown in FIG. 15, the memory 1504 may include instructions 1506 to receive an email thread 104 that includes a plurality of emails 106 including an email 108 that is to be classified.

The processor 1502 may fetch, decode, and execute the instructions 1508 to identify, for the email thread 104, a process 110 associated with the email thread 104.

The processor 1502 may fetch, decode, and execute the instructions 1510 to determine, based on the process 110 associated with the email thread 104 and for each sentence of the email 108 that includes a plurality of sentences, a corresponding classifier 114 from a plurality of classifiers 116.

The processor 1502 may fetch, decode, and execute the instructions 1512 to apply, to each sentence of the email 108, the corresponding classifier 114 to classify each sentence of the email 108 to generate classified sentences 118.

The processor 1502 may fetch, decode, and execute the instructions 1514 to extract, from each of the classified sentences of the email 108, at least one entity 122.

The processor 1502 may fetch, decode, and execute the instructions 1516 to classify, based on the at least one extracted entity 122, the email 108 to generate a classified email 126.

Referring to FIGS. 1-14 and 16, and particularly FIG. 16, for the method 1600, at block 1602, the method may include receiving an email thread that includes a plurality of emails including an email that is to be classified.

At block 1604, the method may include determining, for each sentence of the email that includes a plurality of sentences, a corresponding classifier from a plurality of classifiers.

At block 1606, the method may include applying, to each sentence of the email, the corresponding classifier to classify each sentence of the email to generate classified sentences.

At block 1608, the method may include extracting, from each of the classified sentences of the email, at least one entity.

At block 1610, the method may include classifying, based on the at least one extracted entity, the email.

Referring to FIGS. 1-14 and 17, and particularly FIG. 17, for the block diagram 1700, the non-transitory computer readable medium 1702 may include instructions 1706 to receive an email thread that includes a plurality of emails including an email that is to be classified.

The processor 1704 may fetch, decode, and execute the instructions 1708 to determine, for each sentence of the email that includes a plurality of sentences, a corresponding classifier from a plurality of classifiers.

The processor 1704 may fetch, decode, and execute the instructions 1710 to apply, to each sentence of the email, the corresponding classifier to classify each sentence of the email to generate classified sentences.

The processor 1704 may fetch, decode, and execute the instructions 1712 to classify, based on the classified sentences, the email.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A structure-based multi-intent email classification apparatus comprising:
an email thread analyzer, executed by at least one hardware processor, to
receive an email thread that includes a plurality of emails including an email that is to be classified, and
identify, for the email thread, a process associated with the email thread, wherein the process defines a logical path of contents of the email thread;
a sentence classifier, executed by the at least one hardware processor, to
select one or more classifiers of a plurality of classifiers based on transition probabilities of occurrences of the process that are affected by the reception of the email to be classified;
determine, based on the process associated with the email thread and for each sentence of the email that includes a plurality of sentences, a corresponding classifier from the one or more classifiers that include at least two of a question, a statement, a command, or a request, and
apply, to each sentence of the email, the corresponding classifier to classify each sentence of the email to generate classified sentences;
an information extractor, executed by the at least one hardware processor, to
extract, from each of the classified sentences of the email, at least one entity; and
an email classifier, executed by the at least one hardware processor, to
classify, based on the at least one extracted entity, the email.

2. The apparatus according to claim 1, wherein the sentence classifier is executed by the at least one hardware processor to determine, based on the process associated with the email thread and for each sentence of the email that includes the plurality of sentences, the corresponding classifier from the plurality of classifiers by:
utilizing an artificial intelligence classification model to determine, based on the process associated with the email thread and for each sentence of the email that includes the plurality of sentences, the corresponding classifier from the one or more classifiers.

3. The apparatus according to claim 1, wherein the information extractor is executed by the at least one hardware processor to extract, from each of the classified sentences of the email, at least one entity by:
utilizing an artificial intelligence information extraction model to extract, from each of the classified sentences of the email, at least one entity.

4. The apparatus according to claim 1, wherein the email classifier is executed by the at least one hardware processor, to classify, based on the at least one extracted entity, the email by:
determining, for a plurality of extracted entities including the at least one extracted entity, a confidence associated with each entity of the plurality of extracted entities; and
classifying, based on the confidence associated with each entity of the plurality of extracted entities, the email.

5. The apparatus according to claim 4, wherein the email classifier is executed by the at least one hardware processor, to classify, based on the at least one extracted entity, the email by:
aggregating the confidence associated with each entity of the plurality of extracted entities.

6. A method for structure-based multi-intent email classification, the method comprising:
receiving, by at least one hardware processor, an email thread that includes a plurality of emails including an email that is to be classified, wherein the email thread pertains to a process, that defines a logical path of contents of the email thread;
identifying, by the at least one hardware processor, for the email thread, the process associated with the email thread;
selecting, by the at least one hardware processor, one or more classifiers of a plurality of classifiers based on transition probabilities of occurrences of the process that are affected by the reception of the email to be classified;
determining, by the at least one hardware processor, for each sentence of the email that includes a plurality of sentences, a corresponding classifier from the one or more classifiers that include at least two of a question, a statement, a command, or a request;
applying, by the at least one hardware processor, to each sentence of the email, the corresponding classifier to classify each sentence of the email to generate classified sentences;
extracting, by the at least one hardware processor, from each of the classified sentences of the email, at least one entity; and
classifying, by the at least one hardware processor, based on the at least one extracted entity, the email.

7. The method according to claim 6, wherein determining, by the at least one hardware processor, for each sentence of the email that includes the plurality of sentences, the corresponding classifier from the plurality of classifiers further comprises:
utilizing an artificial intelligence classification model to determine, for each sentence of the email that includes the plurality of sentences, the corresponding classifier from the one or more classifiers.

8. The method according to claim 6, wherein extracting, by the at least one hardware processor, from each of the classified sentences of the email, at least one entity further comprises:
utilizing an artificial intelligence information extraction model to extract, from each of the classified sentences of the email, at least one entity.

9. The method according to claim 6, wherein classifying, by the at least one hardware processor, based on the at least one extracted entity, the email further comprises:
determining, for a plurality of extracted entities including the at least one extracted entity, a confidence associated with each entity of the plurality of extracted entities; and
classifying, based on the confidence associated with each entity of the plurality of extracted entities, the email.

10. The method according to claim 9, wherein classifying, by the at least one hardware processor, based on the at least one extracted entity, the email further comprises:
aggregating the confidence associated with each entity of the plurality of extracted entities.

11. The method for structure-based multi-intent email classification of claim 6, further comprising:

automatically generating an email including the at least one entity with an attached invoice, wherein the email enables one of automatically placing an order and applying discount to an order.

12. A non-transitory computer readable medium having stored thereon machine readable instructions, the machine readable instructions, when executed by at least one hardware processor, cause the at least one hardware processor to:

receive an email thread that includes a plurality of emails including an email that is to be classified, wherein the email thread pertains to a process that defines a logical path of contents of the email thread;

identify for the email thread, the process associated with the email thread;

select one or more classifiers of a plurality of classifiers based on transition probabilities of occurrences of the process that are affected by the reception of the email to be classified;

determine, for each sentence of the email that includes a plurality of sentences, a corresponding classifier from the one or more classifiers that include at least two of a question, a statement, a command, or a request;

apply, to each sentence of the email, the corresponding classifier to classify each sentence of the email to generate classified sentences; and classify, based on the classified sentences, the email.

13. The non-transitory computer readable medium according to claim 12, wherein the machine readable instructions, when executed by the at least one hardware processor, further cause the at least one hardware processor to:

extract, from each of the classified sentences of the email, at least one entity; and classify, based on the at least one extracted entity, the email.

14. The non-transitory computer readable medium according to claim 12, wherein the machine readable instructions to determine, for each sentence of the email that includes the plurality of sentences, the corresponding classifier from the plurality of classifiers, when executed by the at least one hardware processor, further cause the at least one hardware processor to:

identify, for the email thread, a process associated with the email thread; and determine, based on the process associated with the email thread and for each sentence of the email that includes the plurality of sentences, the corresponding classifier from the one or more classifiers.

15. The non-transitory computer readable medium according to claim 12, wherein the machine readable instructions to determine, for each sentence of the email that includes the plurality of sentences, the corresponding classifier from the plurality of classifiers, when executed by the at least one hardware processor, further cause the at least one hardware processor to:

utilize an artificial intelligence classification model to determine, for each sentence of the email that includes the plurality of sentences, the corresponding classifier from the plurality of classifiers.

16. The non-transitory computer readable medium according to claim 13, wherein the machine readable instructions to extract, from each of the classified sentences of the email, at least one entity, when executed by the at least one hardware processor, further cause the at least one hardware processor to:

utilize an artificial intelligence information extraction model to extract, from each of the classified sentences of the email, at least one entity.

17. The non-transitory computer readable medium according to claim 13, wherein the machine readable instructions to classify, based on the at least one extracted entity, the email, when executed by the at least one hardware processor, further cause the at least one hardware processor to:

determine, for a plurality of extracted entities including the at least one extracted entity, a confidence associated with each entity of the plurality of extracted entities; and classify, based on the confidence associated with each entity of the plurality of extracted entities, the email.

* * * * *